United States Patent [19]

Okado et al.

[11] 4,360,627

[45] Nov. 23, 1982

[54] RUBBER COMPOSITION COMPRISING FURNACE CARBON BLACK

[75] Inventors: Yosuke Okado, Higashimurayama; Masanori Kawamura, Akigawa; Takashi Tomioka, Higashimurayama, all of Tokyo, Japan

[73] Assignee: Bridgestone Tire Company Limited, Tokyo, Japan

[21] Appl. No.: 229,500

[22] Filed: Jan. 29, 1981

[30] Foreign Application Priority Data

Jan. 30, 1980 [JP] Japan .................................. 55-8704

[51] Int. Cl.$^3$ .............................................. C08K 3/04
[52] U.S. Cl. .................................... 524/496; 260/746; 260/756; 260/763; 106/307; 524/237; 524/322; 524/575
[58] Field of Search ............ 260/746, 756, 763, 42.47; 106/307; 524/496

[56] References Cited

U.S. PATENT DOCUMENTS

| | | | |
|---|---|---|---|
| 3,245,820 | 4/1966 | Melore et al. | 106/307 |
| 3,301,694 | 1/1967 | Kraus et al. | 106/307 |
| 3,353,980 | 11/1967 | Johnson | 106/307 |
| 3,523,812 | 8/1970 | Kraus | 106/307 |
| 3,830,774 | 8/1974 | Jordan et al. | 106/307 |
| 3,959,008 | 5/1976 | Warner et al. | 106/307 |
| 3,973,983 | 8/1976 | Jordan et al. | 106/307 |
| 4,071,496 | 1/1978 | Kraus et al. | 260/42.32 |
| 4,259,218 | 5/1981 | Haws | 260/42.47 |

OTHER PUBLICATIONS

Chem. Abst. 87 (137109b), Nakada, et al., J7774647, (Tokai Carbon), Jun. 22, 1977, "Furnace Carbon Black for Tire Treads".
Chem. Abst. 5220s, vol. 78, (1973), Jordan, et al., (DT 2211320), "Furnace Black As a Filler for Rubber", Cabot Corp.
Chem. Abst., vol. 85, (161579r), "Carbon Black", (NL7508808), Jan. 27, 1976, Continental Carbon Co.
Chem. Abst., vol. 92, (1980), 77751(c), Kraus, et al., "Characterization of Carbon Blacks . . . ", Phillips Pet.

*Primary Examiner*—John C. Bleutge
*Assistant Examiner*—Herbert J. Lilling
*Attorney, Agent, or Firm*—Sughrue, Mion, Zinn, Macpeak & Seas

[57] ABSTRACT

A rubber composition having a good reinforcing property and a remarkably improved resistance against heat build-up is disclosed, which comprises 100 parts by weight of at least one of natural rubber and synthetic rubber and 20-200 parts by weight of furnace carbon black having a specific surface area of 85-95 m$^2$/g, a dibutyl phthalate absorption value of 100-110 ml/100 g and a tinting strength of 95-105.

3 Claims, 1 Drawing Figure

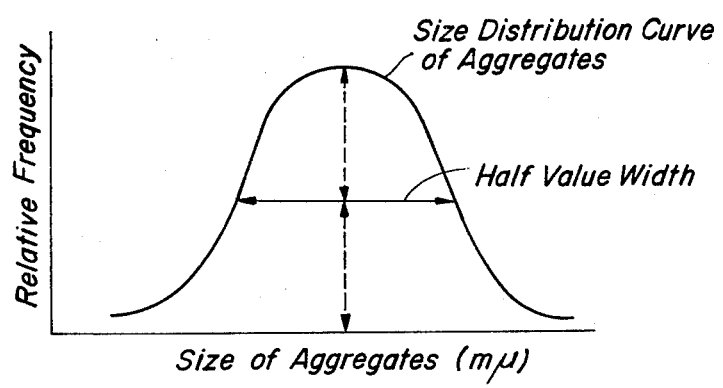

RUBBER COMPOSITION COMPRISING FURNACE CARBON BLACK

BACKGROUND OF THE INVENTION (1) Field of the Invention

The present invention relates to a rubber composition, and more particularly a rubber composition containing novel furnace carbon black and having a good reinforcing property and a remarkably improved resistance against heat build-up.

(2) Description of the Prior Art

It is commonly known that rubber articles, such as tires and the like, are generally formed of a plurality of rubber members, and that the rubber members are required to have different performances. In order to satisfy necessary requirements, it is necessary to select properly the kind and amount of carbon black to be contained in a rubber composition constituting the rubber members.

In the carbon black, the specific surface area and structure are important properties. For example, carbon black having a large specific surface area has an improved reinforcing property (wear resistance), but is poor in resistance against heat build-up. Carbon black having a large structure has a high modulus of elasticity, but is poor in fatigue resistance and cut resistance. That is, carbon black, which can satisfy both the reinforcing property and the resistance against heat build-up, or satisfy both the modulus of elasticity and the fatigue resistance and the cut resistance, has not yet been found.

Recently, resource saving and energy saving are socially demanded, and investigations for developing automobiles with low gasoline consumption are directed not only to the improvement of engines, but also to low fuel consumption tires which are low in power loss.

In order to satisfy the above described demands, rubber compositions having a low heat build-up have recently been demanded more and more, and various investigations for modifying polymers and the like have been recently predominantly carried out. However, there is a risk, in the modification a polymer, of deterioration of properties other than the heat build-up of a rubber composition.

The inventors have made various investigations with respect to carbon black which is contained, as an essential component, in a rubber composition used in tires and other rubber articles, and found out that when carbon black having a low heat build-up is used, substantially all kinds of polymers can be used, and rubber compositions having a low heat build-up can be easily produced depending upon the use purpose. The inventors have made further various investigations based on the above discovery, and found out that some of the properties of carbon black other than its specific surface area and structure have a high influence upon the heat build-up and reinforcing property of rubber, and accomplished the present invention.

SUMMARY OF THE INVENTION

The feature of the present invention lies in a rubber composition comprising 100 parts by weight of at least one of natural rubber and synthetic rubber and 20–200 parts by weight of carbon black, said carbon black being furnace carbon black having a specific surface area ($N_2SA$) of 85–95 $m^2/g$ measured by the nitrogen adsorption method, a dibutyl phthalate absorption value (24M4 DBP) of 100–110 ml/100 g and a tinting strength (TINT) of 95–105.

BRIEF DESCRIPTION OF THE DRAWING

The FIGURE is a graph showing a size distribution curve of aggregates and explaining the half value width of the sizes of the aggregates.

DESCRIPTION OF THE PREFERRED EMBODIMENT

The synthetic rubbers to be used in the present invention include styrene-butadiene copolymer rubber, polybutadiene rubber, synthetic polyisoprene rubber, chloroprene rubber, ethylene-propylene-diene terpolymer rubber, ethylene-propylene copolymer rubber, butyl rubber, halogenated butyl rubber, butadiene-acrylonitrile copolymer rubber and the like, and rubber blends of at least two of the above described rubbers.

The carbon black to be used in the present invention is furnace carbon black having an $N_2SA$ of 85–95 $m^2/g$, a 24M4 DBP of 100–110 ml/100 g and a TINT of 95–105, preferably having an $N_2SA$ of 85–92 $m^2/g$, a 24M4 DBP of 103–110 ml/100 g and a TINT of 98–105. When carbon black has an $N_2SA$ of less than 85 $m^2/g$, the resulting rubber composition is poor in wear resistance. When carbon black has an $N_2SA$ of more than 95 $m^2/g$, the resulting rubber composition is poor in resistance against heat build-up. When carbon black has a 24M4 DBP of less than 100 ml/100 g, the resulting rubber composition is low in modulus. When carbon black has a 24M4 DBP of more than 110 ml/100 g, the resulting rubber composition is poor in cut resistance. When carbon black has a TINT of less than 95, the resulting rubber composition is poor in wear resistance. When carbon black has a TINT of more than 105, the resulting rubber composition is poor in resistance against heat build-up.

Further, in the present invention, when furnace carbon black having such a particle size is used that the aggregates obtained from the carbon black by the centrifugal sedimentation method have a size distribution curve having a half value width ($\Delta D_{50}(Dst)$) of at least 180 m$\mu$, the resulting rubber composition has a more improved resistance against heat build-up, and the use of furnace carbon black having such a size distribution in the aggregate form is preferable.

In the present invention, the compounding amount of the above described furnace carbon black is not particularly limited, but the furnace carbon black is generally used in an amount used in the rubber industry, for example, in an amount of 20–200 parts by weight based on 100 parts by weight of rubber.

The rubber composition of the present invention may contain a vulcanizer, such as sulfur or the like, vulcanization accelerator, accelerator activator, antioxidant, softener, filler and the like in addition to the carbon black.

As described above, the rubber composition according to the present invention, which contains the carbon black having a specifically limited property, has a high reinforcing property and a remarkably improved resistance against heat build-up, and can be effectively used as a rubber for a tire, particularly as a tread rubber, and further can be used in industrial rubber articles, such as a conveyor belt, hose and the like.

The carbon black to be used in the present invention can be generally produced by means of an apparatus for producing carbon black by a furnace method, wherein a hydrocarbon feedstock is introduced into a cylindrical reaction furnace along the longitudinal axis, and a fuel and an oxygen-containing gas for producing a hot combustion gas flow necessary for decomposing thermally the hydrocarbon feedstock to carbon black are introduced into the head portion of the reaction furnace, and a gas flow containing the resulting carbon black suspended therein is quenched with water, and then the resulting carbon black is recovered.

However, in the present invention, carbon black is advantageously produced by the use of an apparatus for producing carbon black comprising a cylindrical air-mixing chamber, a cylindrical preliminary reaction chamber and a cylindrical final reaction chamber, which have diameters increasing stepwise and are successively coaxially connected with each other, said air-mixing chamber being provided with an inlet for primary air, an injection nozzle for the hydrocarbon feedstock and a pair of inlets for secondary air, which inlets are opposed to each other and inclined at an equal angle of 40° with respect to the axis of the above described injection nozzle, said preliminary reaction chamber being provided in its tangential direction with at least one inlet for introducing a mixture of fuel and oxygen-containing gas or for introducing a hot gaseous reaction mixture formed by previous combustion of the fuel and oxygen-containing gas, and said fuel reaction chamber having an end portion throttled to substantially the same diameter as that of the above described preliminary reaction chamber.

The hot combustion gas to be used in the production of carbon black according to the present invention is produced by mixing liquid or gaseous fuel with oxygen-containing gas (air, oxygen or a mixture of air and oxygen) in a preliminary reaction chamber having a refractory lining.

As the fuel suitable for the production of the hot combustion gas, use is made of gaseous saturated hydrocarbons, such as methane, ethane, propane, butane and the like; gaseous unsaturated hydrocarbons, such as acetylene, ethylene, propylene, butylene and the like; liquid aromatic hydrocarbons, such as benzene, toluene, xylene and the like; liquid alcohols, such as methanol, ethanol and the like; light oils, such as gas oil, kerosene and the like; heavy oils, such as fuel oil and the like; and polycyclic aromatic oils, such as creosote oil, ethylene cracker tar and the like.

As the hydrocarbon feedstock for carbon black, use is made of polycyclic aromatic oils, such as creosote oil, ethylene cracker tar and the like; and other oils.

In the production of carbon black, the hydrocarbon feedstock to be converted into carbon black is introduced into an air-mixing chamber, which has a refractory lining and has the smallest diameter, in the axial direction, and primary air is introduced into the air-mixing chamber in the same direction as that of the hydrocarbon feedstock. Further, secondary air is introduced into the air-mixing chamber through a pair of inlets opposed to each other and inclined at an equal angle of 40° with respect to the introduction axis of the hydrocarbon feedstock injector. The introduction of the secondary air is very effective not only for the formation of high-temperature areas, wherein a violent reaction suitable for the production of hard type carbon black is carried out, but also for increasing structure by mixing violently the secondary air with the hydrocarbon feedstock. The homogeneous mixture of hydrocarbon feedstock and oxygen-containing gas formed in the air-mixing chamber is fed into a preliminary reaction chamber in the next stage, which chamber has a diameter larger than that of the air-mixing chamber. In the preliminary reaction chamber having a refractory lining, a hot combustion gas flow, which surrounds the above described mixture of hydrocarbon feedstock and oxygen-containing gas, is developed by the reaction of fuel and oxygen-containing gas introduced into the preliminary reaction chamber through the side wall in the tangential direction thereof to contact the gas flow with the hydrocarbon feedstock, whereby a violent carbon black-forming reaction proceeds.

The reaction mixture, after passage through the preliminary reaction chamber, is fed into a final reaction chamber having a refractory lining and having the largest diameter. Since the final reaction chamber has a diameter larger than that of the preliminary reaction chamber, a secondary vortex gas flow is generated and further diffused and scattered into the reaction mixture to complete easily the carbon black-forming reaction. Moreover, since the final reaction chamber has a throttled end portion, the pressure in the reaction furnace is increased to promote the development of structure in the resulting carbon black.

A suspended effluent containing carbon black formed by the completion of the carbon black-forming reaction is quenched in the throttled portion of the final reaction chamber or in the downstream side of the throttled portion by the quenching water sprayed from an injection nozzle arranged at said portion or said side. The resulting suspension is passed through a flue conduit arranged at the down-stream side of the throttled portion, and then separated into carbon black and off gas by means of a commonly used separating means, for example, a bag filter.

The carbon black according to the present invention is produced by the use of the above described production apparatus, by selecting properly the hydrocarbon feedstock so as to be able to obtain carbon black having a certain high structure level, and further by setting properly the ratio of air/fuel, that is, the stoichiometrically excess air, the location for introducing quenching water, the quenching rate for the carbon black-containing suspension and other conditions.

The carbon black to be used in the present invention will be fully understood from the production condition, physical and chemical properties and rubber property shown in the following production examples.

PRODUCTION EXAMPLE 1

As an apparatus for producing carbon black, use was made of an apparatus comprising a cylindrical air-mixing chamber, a cylindrical preliminary reaction chamber and a cylindrical final reaction chamber, which had diameters increasing stepwise and were coaxially connected with each other, said air-mixing chamber being provided with an injection nozzle for hydrocarbon feedstock in the axial direction, an inlet for primary air and a pair of inlets for secondary air, which were opposed to each other and inclined at an equal angle of 40° with respect to the axis of the above described injection nozzle, said preliminary reaction chamber being provided with two inlets for introducing a mixture of air and fuel or for introducing a hot gaseous reaction mixture formed by a previous combustion of the fuel and air necessary for generating sufficiently a large amount of hot combustion gas for thermally decomposing the above described hydrocarbon feedstock into carbon black, and said final reaction chamber being provided at its end portion with a throttled portion, and further at downstream of the throttled portion with a quenching zone having a spray nozzle for quenching water and a filtering means for separating the resulting carbon black and the off-gas from the suspended effluent.

Carbon black was produced under the following conditions. Air preheated to 350° C. was introduced into the preliminary reaction chamber at a rate of 5,240 kg/hr together with natural gas at a rate of 250 kg/hr through two inlets arranged on the chamber to form a hot combustion gas having a sufficiently high temperature for producing carbon black by the thermal decomposition of the hydrocarbon feedstock. Into the air-mixing chamber were introduced a hydrocarbon feedstock preheated to 250° C. at a rate of 1,000 l/hr under a pressure of 10 kg/cm$^2$ through an injection nozzle in the axial direction, primary air preheated to 350° C. at a rate of 300 kg/hr in the same direction as that of the hydrocarbon feedstock through an inlet for primary air, and further secondary air preheated to 350° C. at a rate of 1,040 kg/hr through a pair of inlets for secondary air, which were opposed to each other and inclined at an equal angle of 40° with respect to the axis of the injection nozzle. The hydrocarbon feedstock had a specific gravity (15/4° C.) of 1.056, a BMCI (Bureau of Mines Correlation Index) of 136 and a CCR (Conradson Carbon Residue) of 9.5%.

Under the above described production conditions, the preliminary reaction chamber was kept at a temperature of 1,650° C. and the final reaction chamber was kept at a temperature of 1,560° C. The carbon black produced by the thermal decomposition of the hydrocarbon feedstock under the above described condition was quenched to a temperature of not higher than 500° C. by spraying quenching water through a spray nozzle at a rate of 3,163 l/hr, which nozzle was located down stream of the throttled portion and was apart by 1.7 m from the position of the injection nozzle for hydrocarbon feedstock, and the resulting carbon black-containing suspension was passed through a conventional separating and recovering apparatus to obtain carbon black.

The resulting carbon black had an $N_2SA$ of 90 m$^2$/g, a 24M4 DBP of 105 ml/100 g, a TINT of 101 and a $\Delta D_{50}$ of 190 m$\mu$ measured by the centrifugal sedimentation method.

PRODUCTION EXAMPLE 2

The same reaction apparatus as described in Production Example 1 was used, and air preheated to 350° C. was introduced into a preliminary reaction chamber at a rate of 7,223 kg/hr together with natural gas at a rate of 375 kg/hr through two inlets arranged on the chamber to form hot combustion gas flow. A hydrocarbon feedstock preheated to 250° C. was introduced into an air-mixing chamber at a rate of 1,500 l/hr under a pressure of 12.5 kg/cm$^2$ in the axial direction, and primary air preheated to 350° C. was introduced into the air-mixing chamber at a rate of 450 kg/hr in the same direction as that of the hydrocarbon feedstock. Further, secondary air preheated to 350° C. was introduced into the air-mixing chamber through a pair of inlets for secondary air at a rate of 1,445 kg/hr. Properties of the hydrocarbon feedstock were same as those of the hydrocarbon feedstock used in Production Example 1.

Under the above described production conditions, the preliminary reaction chamber was kept at a temperature of 1,675° C. and the final reaction chamber was kept at a temperature of 1,565° C. A spray nozzle for quenching water was arranged at position apart by 2.7 m from the position of an injection nozzle for the hydrocarbon feedstock, and the resulting carbon black-containing suspension was quenched by 4,380 kg/hr of quenching water.

The resulting carbon black had an $N_2SA$ of 92 m$^2$/g, a 24M4 DBP of 103 ml/100 g, a TINT of 98 and a $\Delta D_{50}$ of 200 m$\mu$ measured by the centrifugal sedimentation method.

PRODUCTION EXAMPLE 3

The same reaction apparatus as described in Production Example 1 was used, and air preheated to 350° C. was introduced into a preliminary reaction chamber at a rate of 6,656 kg/hr together with natural gas at a rate of 325 kg/hr through two inlets arranged on the chamber to form a hot combustion gas flow. A hydrocarbon feedstock preheated to 250° C. was introduced into an air-mixing chamber at a rate of 1,300 kg/hr under a pressure of 10 kg/cm$^2$ in the axial direction, and primary air preheated to 350° C. was introduced into the air-mixing chamber at a rate of 390 kg/hr in the same direction as that of the hydrocarbon feedstock. Further, secondary air preheated to 350° C. was introduced into the air-mixing chamber through a pair of inlets for secondary air at a rate of 1,450 kg/hr. Properties of the hydrocarbon feedstock were same as those of the hydrocarbon feedstock used in Production Example 1.

Under the above described production conditions, the preliminary reaction chamber was kept at a temperature of 1,670° C. and the final reaction chamber was kept at a temperature of 1,560° C. A spray nozzle for quenching water was arranged at the same position as that in Production Example 1, and the resulting carbon black-containing suspension was quenched by 4,080 kg/hr of quenching water.

The resulting carbon black had an $N_2SA$ of 88 m$^2$/g, a 24M4 DBP of 107 ml/100 g, a TINT of 103 and a $\Delta D_{50}$ of 185 m$\mu$ measured by the centrifugal sedimentation method.

PRODUCTION EXAMPLE 4

The same reaction apparatus as described in Production Example 1 was used, and air preheated to 350° was introduced into a preliminary reaction chamber at a rate of 5,086 kg/hr together with natural gas at a rate of 270 kg/hr through two inlets arranged on the chamber to form a hot combustion gas flow. A hydrocarbon feedstock prehated to 250° C. was introduced into an air-mixing chamber at a rate of 1,000 kg/hr under a pressure of 10 kg/cm$^2$ in the axial direction, and primary air preheated to 350° C. was introduced into the air-mixing chamber at a rate of 300 kg/hr in the same direction as that of the hydrocarbon feedstock. Further, secondary air preheated to 350° C. was introduced into the air-mixing chamber through a pair of inlets for secondary air at a rate of 1,100 kg/hr. Properties of the hydrocarbon feedstock were same as those of the raw material hydrocarbon used in Production Example 1.

Under the above described production conditions, the preliminary reaction chamber was kept at a temperature of 1,700° C. and the final reaction chamber was kept at a temperature of 1,590° C. A spray nozzle for quenching water was arranged at a position apart by 1.9 m from the injection nozzle for hydrocarbon feedstock, and the resulting carbon black-containing suspension was quenched by 3,120 kg/hr of quenching water.

The resulting carbon black had an $N_2SA$ of 89 m²/g, a 24M4 DBP of 106 ml/100 g, a TINT of 100 and a $\Delta D_{50}$ of 175 mμ measured by the centrifugal sedimentation method.

The following examples are given for the purpose of illustration of this invention and are not intended as limitations thereof.

EXAMPLE 1

Rubber compositions containing various carbon blacks shown in the following Table 1 were kneaded, and then vulcanized at 145° C. for 30 minutes to obtain vulcanizates. In the above experiments, carbon blacks produced in the above described Production Examples 1–4 were used in rubber composition sample Nos. 1–4 of the present invention respectively, and commercially available carbon black was used in comparative rubber composition sample Nos. 5–16. The tensile stress, wear resistance and resistance against heat build-up of the vulcanizates were evaluated, and the obtained results are shown in Table 1.

The evaluation methods of the above described properties are as follows.

Tensile stress

The stress of a rubber composition sample at 300% elongation is measured according to JIS K6301, and the stress is evaluated by an index indicated by the ratio of the stress at 300% elongation of a rubber composition sample to that of rubber composition sample No. 16 containing a standard carbon black IRB#4, the latter stress being defined as 100. The larger the index, the higher the tensile stress is.

Wear resistance

A disc of a test piece is disposed on an abrasive disc in a parallel relation and rotated while contacting with the abrasive disc to induce slip therebetween by means of a Lambourn abrasion tester, and the worn amount of the test piece per unit time is measured. The wear resistor of a rubber composition sample is evaluated by an index indicated by the reciprocal of the ratio of the worn amount of the rubber composition sample to that of rubber composition sample No. 16, the latter worn amount being defined as 100. The higher the index, the higher the wear resistance is.

Resistance Against Heat Build-Up

The resilience of a rubber composition sample is measured by means of a Dunlop tripsometer, and evaluated by an index indicated by the ratio of the resilience of the rubber composition sample to that of rubber composition sample No. 16, the latter resilience being defined as 100. The higher the resilience, the higher the resistance against heat build-up is.

TABLE 1(a)

| Rubber compostion sample No. | | Present invention | | | | Comparative sample | | | | | | | | | | | IRB #4 |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 |
| Compounding recipe (parts by weight) | Styrene-butadiene copolymer rubber | 100 | 100 | 100 | 100 | 100 | 100 | 100 | 100 | 100 | 100 | 100 | 100 | 100 | 100 | 100 | 100 |
| | Carbon black | 50 | 50 | 50 | 50 | 50 | 50 | 50 | 50 | 50 | 50 | 50 | 50 | 50 | 50 | 50 | 50 |
| | Aromatic oil | 10 | 10 | 10 | 10 | 10 | 10 | 10 | 10 | 10 | 10 | 10 | 10 | 10 | 10 | 10 | 10 |
| | Stearic acid | 1 | 1 | 1 | 1 | 1 | 1 | 1 | 1 | 1 | 1 | 1 | 1 | 1 | 1 | 1 | 1 |
| | Zinc white | 3 | 3 | 3 | 3 | 3 | 3 | 3 | 3 | 3 | 3 | 3 | 3 | 3 | 3 | 3 | 3 |
| | 1,3-Diphenyl-guanidine | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| | Dibenzothiazolyl disulfide | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| | Sulfur | 1.75 | 1.75 | 1.75 | 1.75 | 1.75 | 1.75 | 1.75 | 1.75 | 1.75 | 1.75 | 1.75 | 1.75 | 1.75 | 1.75 | 1.75 | 1.75 |

TABLE 1(b)

| Rubber composition sample No. | | Present invention | | | | Comparative sample | | | | | | | | | | | HRB #4 |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 |
| Property of carbon black | $N_2SA$ (m²/g) | 90 | 92 | 88 | 89 | 93 | 86 | 84 | 98 | 92 | 89 | 96 | 99 | 81 | 90 | 76 | 82 |
| | 24M4 DBP (ml/100 g) | 105 | 103 | 107 | 106 | 104 | 99 | 103 | 102 | 112 | 107 | 102 | 99 | 98 | 100 | 99 | 86 |
| | TINT | 101 | 98 | 103 | 100 | 108 | 99 | 102 | 106 | 99 | 93 | 106 | 110 | 95 | 103 | 96 | 107 |
| | $\Delta D_{50}$(Dst) (mμ) | 190 | 200 | 185 | 175 | 145 | 135 | 125 | 110 | 140 | 145 | 153 | 140 | 170 | 120 | 152 | 130 |
| Result | Tensile stress, index | 135 | 133 | 136 | 134 | 131 | 137 | 141 | 133 | 143 | 139 | 133 | 132 | 131 | 129 | 133 | 100 |
| | Wear resistance, index | 110 | 110 | 112 | 109 | 115 | 108 | 110 | 113 | 109 | 101 | 111 | 111 | 103 | 106 | 97 | 100 |
| | Resistance against heat build-up, index | 106 | 107 | 106 | 103 | 100 | 98 | 99 | 101 | 102 | 105 | 100 | 100 | 104 | 99 | 108 | 100 |

The $N_2SA$, 24M4 DBP and TINT of the carbon black were measured according to ASTM D3037, D3493 and D3265, respectively. The $\Delta D_{50}$(Dst) of the carbon black was measured by the use of a disc centrifuge made by Joyce Loebl Co. Ltd. in the following manner. That is, carbon black is accurately weighed, and added to a mixture of water and ethanol together with a dispersing agent (surfactant) to prepare a mixed solution of water and ethanol containing the carbon black in a concentration of 500 mg/l. The carbon black is homogeneously dispersed (for example, for 10 minutes) in the solution by means of ultrasonic waves to prepare a sample solution. A disc centrifuge is set to a given rotation speed, for example, to 8,000 rpm. The sample solutions (0.25 ml–1.00 ml) are injected into 30 ml of spin solutions (aqueous solution of 5.0% by volume of glycerine), and centrifugal sedimentations of the carbon black in the sample solutions are started at the same time, and a size distribution curve of the aggregates of the carbon black is plotted by a photoelectric detecting method, and the half value width of the sizes is measured as shown in the FIGURE. In the FIGURE, the broken line has the same length in the upper half portion and the lower half portion, and the half value width is indicated by the length of the solid line.

It can be seen from Table 1 that the rubber composition of the present invention has a good reinforcing property and a remarkably improved resistance against heat build-up.

EXAMPLE 2

Rubber compositions were produced in the same manner as described in Example 1, except that a rubber blend of natural rubber with styrene-butadiene copolymer rubber or a rubber blend of styrene-butadiene copolymer rubber with polybutadiene rubber was used as a polymer, and the properties of the rubber compositions were evaluated in the same manner as described in Example 1. In the above experiments, carbon black produced in the above described Production Example 1 was used in rubber composition sample Nos. 17 and 22 of the present invention, and carbon black produced in the above described Production Example 2 was used in rubber composition sample Nos. 18 and 23 of the present invention. The obtained results are shown in the following Table 2. In Table 2, the properties of rubber composition sample Nos. 17–20 are indicated by an index based on 100 of the index of the properties of rubber composition sample No. 21, and the properties of rubber composition sample Nos. 22–25 are indicated by an index based on 100 of the index of the properties of rubber composition sample No. 26.

TABLE 2(a)

| Rubber composition | | Present invention | | Comparative sample | | IRB#4 | Present invention | | Comparative sample | | IRB#4 |
|---|---|---|---|---|---|---|---|---|---|---|---|
| sample No. | | 17 | 18 | 19 | 20 | 21 | 22 | 23 | 24 | 25 | 26 |
| Compounding recipe (parts by weight) | Natural rubber | 70 | 70 | 70 | 70 | 70 | | | | | |
| | Styrene-butadiene copolymer rubber | 30 | 30 | 30 | 30 | 30 | 60 | 60 | 60 | 60 | 60 |
| | Polybutadiene rubber | | | | | | 40 | 40 | 40 | 40 | 40 |
| | Carbon black | 50 | 50 | 50 | 50 | 50 | 75 | 75 | 75 | 75 | 75 |
| | Aromatic oil | 4 | 4 | 4 | 4 | 4 | 40 | 40 | 40 | 40 | 40 |
| | Stearic acid | 3 | 3 | 3 | 3 | 3 | 1 | 1 | 1 | 1 | 1 |
| | N—Phenyl-N′—isopropyl-p-phenylenediamine | 1 | 1 | 1 | 1 | 1 | 1 | 1 | 1 | 1 | 1 |
| | Zinc white | 4 | 4 | 4 | 4 | 4 | 3 | 3 | 3 | 3 | 3 |
| | Dibenzothiazolyl-sulfeneamide | 0.2 | 0.2 | 0.2 | 0.2 | 0.2 | 1.5 | 1.5 | 1.5 | 1.5 | 1.5 |
| | 1,3-Diphenylguanidine | | | | | | 0.5 | 0.5 | 0.5 | 0.5 | 0.5 |
| | N—Oxydiethylene-2-benzothiazolysulfenamide | 0.8 | 0.8 | 0.8 | 0.8 | 0.8 | | | | | |
| | Sulfur | 1.8 | 1.8 | 1.8 | 1.8 | 1.8 | 1.75 | 1.75 | 1.75 | 1.75 | 1.75 |

TABLE 2(b)

| Rubber composition | | Present invention | | Comparative sample | | IRB#4 | Present invention | | Comparative sample | | IRB#4 |
|---|---|---|---|---|---|---|---|---|---|---|---|
| sample No. | | 17 | 18 | 19 | 20 | 21 | 22 | 23 | 24 | 25 | 26 |
| Property of carbon black | $N_2SA$ (m$^2$/g) | 90 | 92 | 96 | 98 | 82 | 90 | 92 | 96 | 98 | 82 |
| | 24M4 DBP (ml/100 g) | 105 | 103 | 102 | 102 | 86 | 105 | 103 | 102 | 102 | 86 |
| | TINT | 101 | 98 | 106 | 106 | 107 | 101 | 98 | 106 | 106 | 107 |
| | $\Delta D_{50}$(Dst) (m$\mu$) | 190 | 200 | 153 | 110 | 130 | 190 | 200 | 153 | 110 | 130 |
| Result | Tensile stress, index | 124 | 123 | 120 | 125 | 100 | 143 | 139 | 136 | 144 | 100 |
| | Wear resistance, index | 111 | 110 | 111 | 112 | 100 | 116 | 115 | 115 | 120 | 100 |
| | Resistance against heat build-up, index | 105 | 106 | 100 | 98 | 100 | 105 | 106 | 98 | 97 | 100 |

It can be seen from Table 2 that the rubber composition of the present invention has a good reinforcing property and a remarkably improved resistance against heat build-up.

What is claimed is:

1. A rubber composition comprising 100 parts by weight of at least one of natural rubber and synthetic rubber and 20–200 parts by weight of carbon black, said carbon black being furnace carbon black having a specific surface area ($N_2SA$) of 85–95 m$^2$/g measured by the nitrogen adsorption method, a dibutyl phthalate adsorption value (24M4 DBP) of 100–110 ml/100 g, a tinting strength (TINT) of 95–105 and wherein said furnace carbon black has such a particle size that aggregates obtained from the carbon black by centrifugal sedimentation have a size distribution curve having a half value width ($\Delta D_{50}$(Dst)) of at least 180 m$\mu$.

2. A rubber according to claim 1 wherein said synthetic rubber is styrene-butadiene copolymer rubber, polybutadiene rubber, synthetic polyisoprene rubber, chloroprene rubber, ethylene-propylene-diene terpolymer rubber, ethylene-propylene copolymer rubber, butyl rubber, halogenated butyl rubber, butadiene-acrylonitrile copolymer rubber or a rubber blend thereof.

3. A rubber composition according to claim 1 wherein said carbon black has an $N_2SA$ of 85–92 m$^2$/g, a 24M4 DBP of 103–110 ml/100 g and a TINT of 98–105.

* * * * *